(12) United States Patent
Ziv-El

(10) Patent No.: US 8,064,817 B1
(45) Date of Patent: Nov. 22, 2011

(54) MULTIMODE RECORDING AND TRANSMITTING APPARATUS AND ITS USE IN AN INTERACTIVE GROUP RESPONSE SYSTEM

(76) Inventor: Jakob Ziv-El, Herzilya (IL)

( * ) Notice: Subject to any disclaimer, the term of this patent is extended or adjusted under 35 U.S.C. 154(b) by 91 days.

(21) Appl. No.: 12/475,657

(22) Filed: Jun. 1, 2009

Related U.S. Application Data

(60) Provisional application No. 61/130,792, filed on Jun. 2, 2008.

(51) Int. Cl.
*G09B 5/04* (2006.01)
*G09B 7/00* (2006.01)
*G09G 5/00* (2006.01)

(52) U.S. Cl. ........ 434/319; 434/156; 434/308; 434/322; 434/336; 434/350; 345/156; 345/173

(58) Field of Classification Search .................. 434/156, 434/308, 319, 322, 336, 350; 345/156, 173, 345/179
See application file for complete search history.

(56) References Cited

U.S. PATENT DOCUMENTS

| | | | |
|---|---|---|---|
| 4,012,588 A | 3/1977 | Davis | |
| 4,246,439 A | 1/1981 | Romein | |
| 5,263,869 A | 11/1993 | Ziv-El | |
| 5,302,132 A * | 4/1994 | Corder | 434/156 |
| 5,437,555 A | 8/1995 | Ziv-El | |
| 5,637,839 A | 6/1997 | Yamaguchi | |
| 5,754,169 A | 5/1998 | Yashiro | |
| 5,766,015 A * | 6/1998 | Shpiro | 434/156 |
| 6,302,698 B1 | 10/2001 | Ziv-El | |
| 6,549,751 B1 * | 4/2003 | Mandri | 434/350 |
| 6,625,314 B1 | 9/2003 | Okamoto | |
| 6,678,499 B1 * | 1/2004 | Silverbrook et al. | 434/350 |
| 6,724,371 B1 | 4/2004 | Shenholtz | |
| 6,729,885 B2 * | 5/2004 | Stuppy et al. | 434/322 |
| 6,876,356 B2 | 4/2005 | Zloter | |
| 6,898,411 B2 | 5/2005 | Ziv-El | |
| 6,906,694 B2 | 6/2005 | Iwamoto | |
| 7,249,716 B2 | 7/2007 | Bryborn | |
| 7,478,756 B1 * | 1/2009 | Edenborg et al. | 235/472.03 |
| 7,713,065 B2 * | 5/2010 | Rogers et al. | 434/322 |
| 2002/0054026 A1 * | 5/2002 | Stevenson et al. | 345/173 |
| 2004/0072136 A1 * | 4/2004 | Roschelle et al. | 434/350 |
| 2004/0121298 A1 * | 6/2004 | Creamer et al. | 434/322 |
| 2006/0286539 A1 * | 12/2006 | Tidwell-Scheuring et al. | 434/353 |
| 2008/0096176 A1 * | 4/2008 | Rogers et al. | 434/350 |
| 2008/0096178 A1 * | 4/2008 | Rogers et al. | 434/362 |
| 2008/0096179 A1 * | 4/2008 | Rogers et al. | 434/362 |
| 2008/0096180 A1 * | 4/2008 | Rogers et al. | 434/362 |
| 2008/0096181 A1 * | 4/2008 | Rogers et al. | 434/362 |

\* cited by examiner

*Primary Examiner* — Kang Hu
(74) *Attorney, Agent, or Firm* — Jones, Tullar & Cooper, P.C.

(57) ABSTRACT

A network of terminals, where each terminal is operable by a student in a group as a response apparatus, is in contemporaneous communication with a teacher station. The modes of operation include visual, i.e. hand writing, hand drawing and typing, as well as audio, in particular the voice of the user, which may contemporaneously accompany the visual, such as when explaining what is being drawn. Such an apparatus can also be used by a teacher to author a lesson, including graphics and audio, providing information and questions which are recorded at the teacher station. The communication means between the student apparatuses and the teacher's station is in a preferred embodiment of the invention via an 802.11 wireless gateway when the students are in the same room as the teacher or in close proximity, or via the Internet especially in the case where individual students are remotely located from the teacher.

20 Claims, 11 Drawing Sheets

FIG. 7

| Teacher: | J. McBride | | Subject: | Calculus II | | | Frame | 5 |
|---|---|---|---|---|---|---|---|---|
| Social | | | Wait | | Logon | SelfP | Prev. | Next |
| | | | | | Reports | | | |

Method for the solution of dy/dx=F(x,y) using isoclines

| Seat | Name | Frame | Grade | Keyboard | Graphic | Audio |
|---|---|---|---|---|---|---|
| C2 | Jo Green | 2 | 3 | It could be written in the LaPlace form | $\Gamma(n)=\int_0^\infty e^{-x} x^{n-1} dx$ | 15 |
| C3 | Bill Lance | 5 | 5 | | $c=1$  $c=\frac{1}{2}$  $c=\frac{1}{8}$  solution | |
| C4 | Ann Brown | 3 | 4 | I prefer Frobenius' method | $y_i(x)=x^n \sum_{h=0}^\infty A_i(s_i)x^h$ | 31 |
| C5 | George Elias | 4 | 7 | | $\int_{x_1}^{x_2} y_n(x) dx = \int_0^2 f_n(x) dx$ | |
| C6 | Jo Jones | 6 | 2 | I assume no damping | $k \text{—} M \text{—} f(t)$, $x \rightarrow$ | 28 |

| Student: Jim Lacy | | Subject: Algebra 3 | | | | | March 3, '09 | |
|---|---|---|---|---|---|---|---|---|
| | | Time taken in seconds | | | | | Grade | |
| Frame No. | Attempts | total | to start | to write | to type | audio | max | given |
| 1 | | 120 | 28 | 80 | 12 | | 5 | 4 |
| 2 | | 86 | 20 | 49 | 15 | 9 | 5 | 2 |
| 3 | | 106 | 19 | 87 | | | 5 | 5 |
| 4 | 3 | 90 | 18 | 59 | 5 | 12 | 5 | 2 |
| 5 | | 80 | 25 | 55 | | | 5 | 5 |
| 6 | | 103 | 20 | 61 | 17 | 7 | 5 | 4 |
| 7 | | 76 | 17 | 51 | 8 | | 5 | 5 |
| 8 | 2 | 75 | 32 | 31 | | 14 | 5 | 1 |
| 9 | | 86 | 16 | 54 | 16 | | 5 | 5 |
| 10 | | 66 | 22 | 38 | | 6 | 5 | 3 |
| Mean | | 88.8 | 21.7 | 56.5 | 7.3 | 4.8 | 5 | 3.7 |

FIG. 8

Reports

Manual Grading
Summarized Student Report
Summarized Question Report
Individual Student Report
Detail Report
Dynamic Responses

*FIG. 9*

Summarized Student Report

| Biology 3 | C.Johnson | | | Save  Print  Responses | | | March 3, '09 |
|---|---|---|---|---|---|---|---|
| | | | | Time profile | | | |
| Name | Grade | total min. | start % | write % | type % | audio % |
| Jim Allen | 77 | 43.8 | 26 | 74 | | |
| Barbi Blanks | 55 | 36.1 | 20 | 68 | 8 | 8 |
| Neil Chany | 90 | 44.2 | 25 | 75 | | |
| George Daniels | 31 | 31.6 | 15 | 80 | | 9 |
| Glen Davis | 49 | 43.1 | 21 | 73 | 6 | |
| Hazel Forbes | 61 | 43.1 | 28 | 72 | | |
| Fred Gordon | 87 | 42.1 | 29 | 55 | 10 | 11 |
| Fanny Harris | 59 | 40.1 | 19 | 81 | | |
| Joe Noland | 77 | 38.1 | 29 | 71 | | |
| Jack Zilber | 80 | 40.9 | 30 | 60 | 5 | 6 |
| Mean | 66.6 | 40.3 | 24.2 | 70.9 | 2.9 | 3.4 |

*FIG. 10*

Individual Student Report for Fred Gordon

C. Johnson | Save | Print | Responses | March 3, '09

| Test No. | Grade | Time profile | | | | |
|---|---|---|---|---|---|---|
| | | total min. | start % | write % | type % | audio % |
| 1 | 7 | 1.8 | 12 | 88 | | |
| 2 | 5 | 1.1 | 22 | 68 | | 13 |
| 3 | 0 | 2.1 | 25 | 75 | | |
| 4 | 1 | 1.6 | 15 | 80 | | 11 |
| 5 | 9 | 1.2 | 21 | 73 | 6 | |
| 6 | 1 | 1.1 | 28 | 72 | | |
| 7 | 7 | 2.1 | 29 | 55 | 10 | 10 |
| 8 | 9 | 0.1 | 19 | 81 | | |
| 9 | 7 | 1.3 | 29 | 71 | | |
| 10 | 0 | 0.9 | 21 | 60 | 5 | 16 |
| Mean / Total | 4.6 | 13.3 | 22.1 | 72.3 | 2.1 | 5.0 |

FIG. 11

MULTIMODE RECORDING AND TRANSMITTING APPARATUS AND ITS USE IN AN INTERACTIVE GROUP RESPONSE SYSTEM

This application relies for priority on provisional application Ser. No. 61/130,792 filed Jun. 2, 2008.

TECHNICAL FIELD

The present invention relates to interactive electronic group communication systems and in particular to the field of education where a teacher interacts with students by posing questions and receiving feedback in the form of responses from the students using terminals. The system is also used as a teacher aid in authoring a lesson and for mental chronometry testing in the field of psychology.

NEED FOR THE INVENTION

The present invention is particularly applicable to the field of education but could be used in meeting management and preparation. It should be understood that in what follows the terms teacher and meeting manager, as well as students and meeting participants, are interchangeable in their respective settings. Analogously, the phrase authoring of a lesson is interchangeable with the phrase authoring of a document for presentation.

It is generally recognized that one-on-one teaching, i.e. one student per teacher, has many advantages, one being that the student is required to independently analyze each question asked by the teacher and then formulate an answer by graphic notation, i.e. by writing or drawing using pen and paper or by typing and/or by audio means, in particular speaking. Furthermore, since the teacher receives constant feedback, the teacher can interrupt the student before a response is completed should the teacher believe that the student has not understood the question or is wandering off the right track. With many students partaking in a lesson the problem faced is how to come as close as possible to achieving the same benefits without exceeding the time constraints of a lesson. Thus there is a need for a functionally efficient method and apparatus for a teacher to monitor during a lesson, the graphic and audio responses to questions posed by the teacher to a group of students either directly or via an audio-visual device.

A question can be designed to test either knowledge or creativity. Each student should ideally be able to respond by the most convenient and efficient means and this includes graphic notation, such as hand writing, hand drawing, by typing on a keyboard, or by speaking. By the concept of a keyboard is included a keypad or a virtual keypad shown on a touch sensitive screen.

For some subjects the use of graphic information capturing apparatus such as a handheld scanner or an audio capturing apparatus such as a sound recorder add further possibilities as to the type of questions and responses.

The graphic and audio response periods may overlap such as when a student explains verbally what is being drawn by hand.

The teacher should ideally be able to monitor as many such responses as possible while the responses are being constructed, so that the teacher can decide as soon as possible whether the students are generally on the right track so that, if necessary, the question can immediately be reworded or clarified. Should the teacher be satisfied that the question was generally understood, the teacher can decide after a number of students have completed their responses, what corrective or reinforcing action to take.

Apart from improved teaching performance due to the teacher receiving immediate feedback from many students, there is educational value in a student being encouraged to actually formulate a response in graphics and/or audio rather than merely raising a hand to indicate that one is prepared to respond, even if the teacher does not scrutinize the response, since the action of actual formulation often results in greater precision or "second thoughts", i.e. clarification or amendment of the initial thoughts by the student. Furthermore, more students are likely to respond if more options for the means of responding, e.g. hand writing, drawing, typing and/or speaking, are available.

With respect to existing technology-assisted student response systems, one such system provides each student with a keypad with say five buttons for responding to multiple choice questions. The teacher's station receives the responses of all the students on a screen or console. Clearly this system lends itself to guessing since it does not permit the display of how an answer was derived. Also, questions which encourage creativity are generally not possible.

A more advanced system is where each student has a full alphanumeric keyboard and therefore can respond in a single word or a full sentence and the teacher has a computer station with a screen where the response of each student can be seen. See U.S. Pat. Nos. 5,263,869, 5,437,555 and 6,302,698, prior patents of the present inventor and U.S. Pat. No. 6,898,411. However in a subject such as algebra, where the response may involve complex fractions with factors in the numerator and the denominator, with possible superscripts and/or subscripts, and/or with special symbols such as Greek letters which are not displayed on the usual keyboard, it is relatively complicated and time consuming to enter such a response on a keyboard, compared to writing it by hand.

Similarly, in subjects such as geometry, geography, biology, botany, etc. where ideal responses often require the drawing of an image, responding via a keyboard is relatively difficult in that it requires special skills in the use of computer graphics and it is also time consuming compared to hand drawing or sketching.

Also verbal responses are important in interactive teaching between a teacher and a group of students, particularly in subjects like literature, history, philosophy and psychology, where responses are often lengthy and are therefore best expressed by word of mouth during a lesson, rather than by writing or typing.

Since time is an important consideration, the least time is taken, and often the best explanation is given, when a graphic response involving symbols or sketching is drawn by hand while contemporaneously explaining by word of mouth what is being drawn and the reasons for the steps taken in a multi-step explanation.

One of the most effective methods for enabling a teacher to present information to a group of students in a classroom is by the use of a whiteboard whereon the teacher writes or draws, while verbally explaining the subject matter. Alternatively, the teacher can prepare the lesson off-line, record it and then make use of an electronic whiteboard to present the lesson. An electronic whiteboard is a large display that connects to a computer and a projector. The projector projects the computer desktop onto the board's surface. Loudspeakers for playing audio recordings are included in the setup. As an alternative to the use of an electronic whiteboard, the image on the teacher's computer desktop together with any audio recording that may be present, can be transferred to a large television display. These electronic display means of graphics and audio for use in a classroom will collectively be referred to as a Class Display.

In theory the teacher could prepare and present a lesson by making a video recording of him/herself presenting the lesson and then projecting the video on a Class Display. This is however generally not practical since it involves relatively expensive video equipment, a camera operator and the video recording generally has to be edited which is time consuming. A more practical method for lesson preparation and presentation is therefore needed for use with a Class Display.

Finally there is a need for teaching authorities to have a record of the teaching and learning taking place in a classroom so as to be able to review the performance of both the students and the teacher and hence to be able to take corrective action where necessary.

SUMMARY OF THE INVENTION

The present invention relates to a system enabling the contemporaneous recording and transmission of information by each of a group of students to a teacher station, in response to the same or different questions or requests. The information transmitted by each student can be visual, i.e. graphic notation, such as hand writing, hand drawing and typing, and audio, in particular the voice of the student. The apparatus or terminal used by a student can also be used by a teacher for authoring and recording at the teacher's station a lesson comprising contemporaneous graphics and audio, including questions, for presentation to the group as a whole via an audio-visual device referred to as a Class Display or via the students' apparatuses. Responses of selected students may also be presented to the group via the Class Display for evaluation by the group. Since the individual transmission times of graphic notation and audio is recorded, the system may be used for mental chronometry testing in the field of experimental psychology.

Terminology and Features of the Student Apparatus

Multimode Responder—MMR. In accordance with the present invention the personal multimode communication apparatus or terminal, used by each student or that can be used by a teacher in lesson authoring as will be described, will be referred to in this specification as a Multimode Responder or MMR. The term "MMR" refers to a compact input-output apparatus for generating and communicating graphic notation, in particular hand writing, hand drawing and typing by the user, as well as audio information, particularly the voice input of the user. The duration times of the communication of the graphic and audio information can follow each other or they can overlap in time in all ways possible, such as when verbally explaining what is being drawn. It is noted that a presentation using an MMR shows movement, by virtue, for example, of the reproduction of the graphics stroke-by-stroke or segment-by-segment at the rate at which it was executed, contemporaneously accompanied by a voice commentary, thereby displaying the major elements of a video presentation, without the visual encumbrance of showing a hand holding an electronic pen.

The term "MMR" is used in a generic sense to indicate the existence of such multiple capabilities, but does not limit the MMR apparatus from the inclusion for example, of other graphic information capturing ability such as that resulting from a handheld scanner or document camera, or other audio information input such as that resulting from a sound recorder/player.

Graphic Notation—Hand writing and hand drawing input on a MMR. Several technologies for recording the path of an electronic pen or a stylus in the form of a pen like object moving over a surface, are known. The writing surface could be blank paper in a paper holder, or an erasable tablet, or a sheet of paper with special markings which can be related to the location of the pen tip on the paper. One such technology uses an ultrasound source, emitting pulses at the tip of the pen with two microphones mounted at the periphery of the writing surface. Here the travel time of the sound pulses from source to destination is a measure of distance, from which the position of the pen tip can then be established through triangulation. See U.S. Pat. Nos. 4,012,588, 4,246,439, 5,637,839, 6,724,371, 6,876,356. Another technology uses a moveable ball at the tip of a pen and sensors which sense the position and movement of the ball. See U.S. Pat. No. 6,625,314. Another technology utilizes a paper with a position-coded pattern and a pen which has the means at the tip of the pen to read the pattern and thereby record its path. See U.S. Pat. No. 7,249,716. Another technology, permits writing directly on an LCD screen. See U.S. Pat. Nos. 5,754,169 and 6,906,694.

In some of the cases cited, the beginning and the end of a pen stroke is recognized by sensing the pressure on the tip of the electronic pen, by the use of a micro-switch which is placed in the body of the pen in line with the tip of the pen. Thus a pen stroke is here defined as the action when the tip of the pen is in the depressed position thereby operating the micro-switch. Other technologies rely on infra-red technology for sensing the distance of the pen tip from the surface (U.S. Pat. No. 5,745,169) or by the fact that a ball rotation sensor at the tip, senses the starting and stopping of rotation. Having recorded the path of the pen locally during a pen stroke it is then transmitted to the teacher's station. Stroke-by-stroke transmission is normally a sufficient feedback rate for a teacher to observe, however the position of the pen tip could be transmitted more frequently at fixed time intervals resulting in segment-by-segment transmission of a keystroke.

Additional switches in the form of pushbuttons can be mounted on the body of the pen or other convenient place, for editing functions, such as the erasure of a pen stroke or segment or changing the color or thickness or other appearance of a line.

Graphic Notation—Keyboard input on a MMR. An alpha-numeric keyboard or keypad has an advantage where the desired input is in words or sentences and where an accurate automatic grading or evaluation of student word or numerical response is desired, since the technology for handwriting character recognition and voice recognition is generally less reliable.

Graphic input and the use of a Screen. The presence of a screen on a MMR is helpful for checking graphic notation input by the user, including input via an electronic pen on paper or a tablet, or via a keyboard, or via a graphic information capturing apparatus such as a handheld scanner.

Graphic input can also be accomplished by writing directly on the screen using a stylus such as the commercially known device Cintiq by Wacom. Other uses for a MMR screen will be described with reference to the use of MMRs in an interactive group response system.

Audio Input—Voice input on a MMR. According to the present invention, a student's response may include the voice of the student. Therefore when a number of students are responding to a teacher's question, it is necessary that the voice recording of each MMR should largely exclude the voices of other MMR users who are present in the same room. This is achieved by the use of a unidirectional microphone, such as one of the cardioid types, mounted on each MMR or by the use of an extension unidirectional microphone which can be kept close to the lips.

Other Graphic and Audio inputs on a MMR. In addition to live graphic recording by hand writing or drawing or typing, a handheld scanner or document camera can be connected to (or included in) a MMR where the response required is an image in a document. An additional advantage of the use of a handheld scanner is the ease with which a student can log onto the system by using a personal identity card with a bar code for the student's name and the use of a label on each desk for identifying the desk position.

Also, in addition to the live voice recording of the student, a sound recorder can also be used for responding, for example, in a music lesson.

Since one can verbally comment before, during and after executing a graphic recording, the periods of duration of graphic and audio inputs can overlap in different ways.

Group Response System

Interactive Group Response System. In the field of education according to the invention, each student in a group of students uses a MMR to respond to a teacher's questions. The responses are compiled and monitored at the teacher's station. The whole system may be referred to as a MMR Interactive Group Response System.

In a MMR Interactive Group Response System, two main modes of operation are possible. The first is so-called Social Mode where all students in the group receive the same educational information virtually simultaneously and respond contemporaneously to the same question posed by the teacher. The second is Self-paced Mode where students work at their own pace.

In a MMR Interactive Group Response System, the educational information, including questions, is stored in the computer at the teacher's station in numbered blocks referred to as frames. Usually there is a question embedded in a frame. The frames are numbered consecutively. In Social Mode the teacher initiates the downloading of the same frame to all the students in the group where the visual part appears on the MMR screen and the audio part can be heard via earphones. Alternatively if the students are located in the same room use can be made of a Class Display, such as an electronic whiteboard with sound. If there is a question embedded in the frame, the teacher presses a key which invites all the students to answer the question. In Self-paced Mode a student keys in the frame number or makes use of a Send key in order to receive the next frame and if it contains a question the student responds in the student's own time.

If a question has an answer which can be evaluated automatically, the correct answer is entered on the teacher's computer via a keyboard, electronic pen (if handwriting character recognition is employed) and/or microphone (if voice recognition is employed), together with a code for the criterion for evaluating the answer, together with the frame number and this data is stored in the computer memory. The code indicates, for example, whether a student response must match the stored response exactly, or whether the stored response may be embedded within the student's response.

The teacher's station includes a computer with a screen and, in the case where the students are located in the same room as the teacher, the teacher's station preferably also includes a Class Display particularly for Social Mode operation. The teacher uses the Class Display to direct the attention of the whole class for a common purpose, such as showing a particular frame, or the response of a student for comment by the teacher or by the other students.

While students are responding, the graphic inputs of a number of students are displayed at the teacher's station on the teacher's computer screen next to their names and seat numbers, stroke-by-stroke or segment-by-segment in the case of hand writing or hand drawing, and keystroke-by-keystroke in the case of typing. If a response is hand written and character recognition is employed, a student's response may appear as printed text. In addition, if for example a handheld scanner is used by a student, the scanned image can appear as part of the student's response. Also, each audio response, whether it does or does not accompany a graphic input, is indicated next to each student's name by its duration in seconds, on an ongoing basis. The teacher can thus select to see and/or listen to any response, whether completed or not. A voice response can appear as text, if voice recognition is employed.

Thus a MMR Interactive Group Response System enables the teacher to judge the progress of a number of students, almost in real time and to comment on the correctness of the path that an individual or a number of students are following in the course of responding, thereby avoiding the wastage of time by students who have misunderstood a question or are on the wrong path. Later, particularly in Social Mode, having seen the complete responses of a number of students and grades automatically allocated where this is technically feasible, the teacher can decide what corrective or reinforcing action to take in order to benefit the largest number of students. One such technique is to display or broadcast a particular student's full response, i.e. the student's hand writing, drawing, typing and voice, (possibly accompanied by the student's name and photograph for reinforcement for younger children), to the whole group of students, using the Class Display if the students are located in the same room, or possibly to the MMR of each student if they are in different locations. This can be followed by a critique of the merits and demerits of the response by the teacher and the students.

In a MMR Interactive Group Response System the screen of each student's MMR can receive messages about the correctness of the particular student's response, immediately on completion of a response, to the extent to which the response can be evaluated automatically. An immediate audio message on correctness can in principle also be received, preferably via earphones in order not to disturb other students.

Communication protocol in a MMR Interactive Group Response System. In a preferred embodiment of the invention, communication between each student's MMR and the teacher's station is wireless, e.g. using an 802.11 protocol, when the students are in the same room as the teacher or in close proximity, or via the Internet in the case especially where individual students are remotely located from the teacher.

Use of a MMR by a teacher. A MMR can also be used by a teacher for lesson authoring. Thus the teacher may expound an idea and/or formulate a question by writing and/or drawing and/or speech using a MMR which is in communication with the teacher's computer. Several expositions and questions may be recorded in the computer in succession. Each exposition may be recorded over one or over a series of frames, with at least one frame of the series containing a question. As explained, the frames can be presented to the students by the teacher in the case of Social Mode on the Class Display, if all the students are in the same location, or on the MMR of each student if the students are dispersed in different locations. In the case of Self-paced Mode the audio part of frames and questions are preferably received on the individual MMR earphones, in order that students in the same location while listening to the audio of different frames do not disturb each other.

Although the invention is primarily aimed at the improvement of interactive teaching between a teacher and a group of students, it is obvious that the system could be used for one-on-one teaching, i.e. where the "group" comprises a single student particularly if the student is located remotely from the teacher.

BRIEF DESCRIPTION OF THE DRAWINGS

FIG. 7 is a Self-paced Mode Dynamic Responses screen and shows, an example of student responses on the teacher's screen, at a particular instant of time, of a MMR Interactive Group Response System.

FIG. 8 shows an example of the data accumulated for each student, including grades achieved and times taken.

FIG. 9 shows the Reports drop-down menu.

FIG. 10 shows a Summarized Student Report concerning the performance of each student in a group.

FIG. 11 shows an Individual Student Report for a particular student.

DETAILED DESCRIPTION

Figure 1:
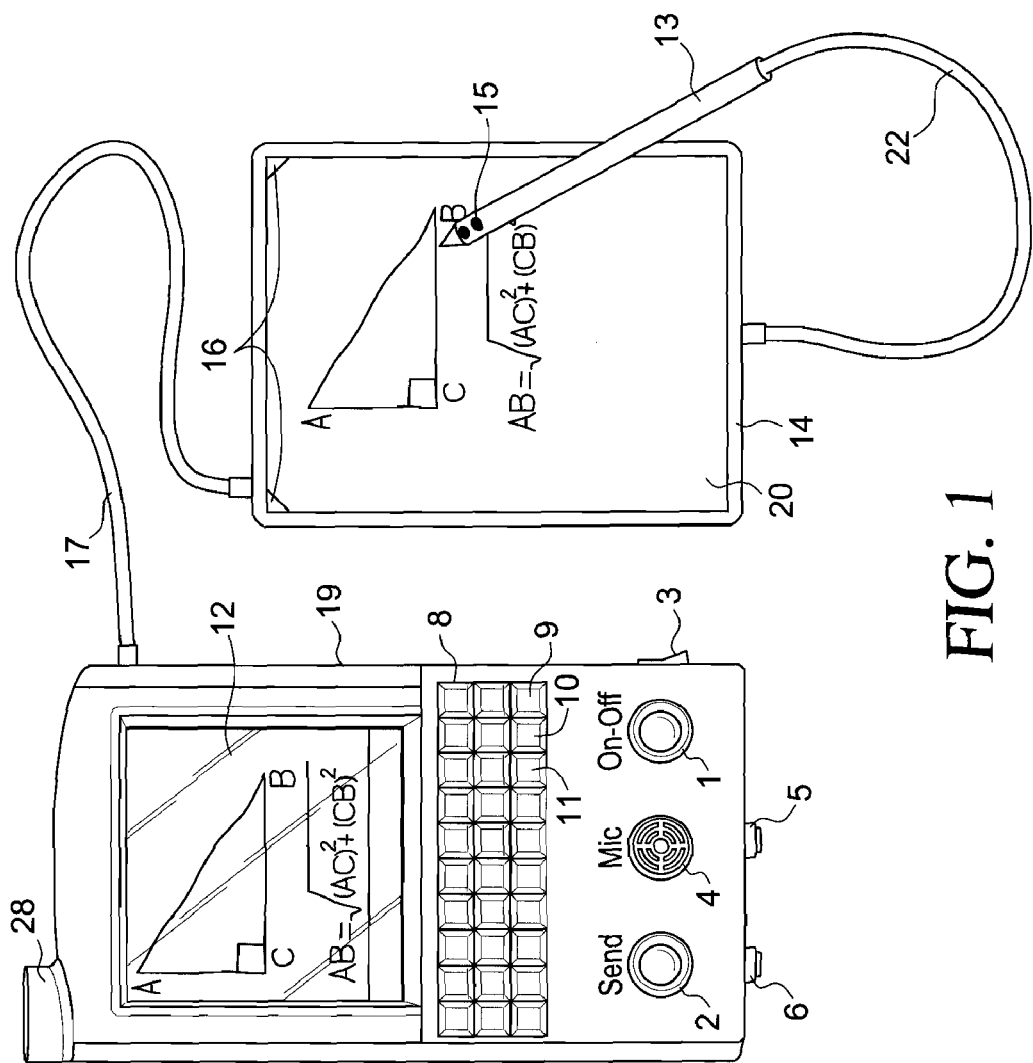
FIG. 1 shows a MMR (Multimode Responder) comprising an electronic pen and a tablet which can have an erasable surface or serve as a paper holder, connected with a cable to the remainder of the apparatus which includes a microphone, a keypad and a screen, according to one embodiment of the invention.

FIG. 1 shows one embodiment of a MMR according to the invention. It comprises the basic unit 19, having a power on-off switch 1, connected with cable 17 to a writing assembly comprising an electronic pen 13 and a writing surface 20 within a holding frame 14, the pen being connected with electrical cable 22. The writing surface 20 for the pen 13 may be a sheet of paper secured in the holding frame 14, or an erasable tablet. When writing a message or drawing an image on writing surface 20, the times of the stroke-by-stroke graphic notation are recorded with the help of a pressure sensitive micro-switch which is located in line with the tip of the electronic pen 13, in the body of the electronic pen.

The path of the movement of the pen tip, when the microswitch in the pen is depressed, can be detected by various known electronic means. For example, one or two ultrasonic sound sources 15, are mounted at the tip of the pen 13 and at least two ultrasonic microphones 16 are mounted on the holding frame 14 at the periphery of the writing surface 20. Using two sound sources 15 in one embodiment enables compensation for the angle of inclination of the pen. The travel times of the sound from sources 15 to destinations 16 are a measure of distances. Thus the exact position of the pen tip can be established through triangulation. See the previously cited U.S. Pat. Nos. 4,012,588, 4,246,439, 5,637,839, 6,724,371, 6,876,356. Thus by periodic sampling of the position of the tip of the pen, the path of the tip of the pen as a function of time can be recorded within the basic unit 19 and eventually transmitted, segment-by-segment or alternatively, as previously stated, stroke-by-stroke.

The cables 17 and 22 can be replaced by wireless links, however it is convenient to use them for power supply since it enables having a single power source for the electronic parts on the basic unit 19, for the pen 13, and for the electronic parts within the holding frame 14 with its ultrasonic microphones 16.

An alphanumeric keypad 8 is placed as shown, or an external plug-in keyboard can be used.

Whatever is drawn on the surface 20 appears on the LCD screen 12. Keys such as 9, 10 and 11 on the keypad 8, serve functions such as to erase the last pen stroke on the screen 12 or to affect functions such as editing the color and thickness of a line that is drawn with pen 13, or to key in the number of a frame one wishes to access when working in Self-paced Mode.

In addition to producing an image on screen 12 using electronic pen 13, the output of a graphic information capturing apparatuses such as a handheld scanner, for example commercial product Docupen by Planon Systems, or a document camera can be fed into a MMR through two side sockets in basic unit 19. Alternatively, a handheld scanner can be built into one side of the MMR and a camera can also be built into the apparatus, in the same way as cameras are built into cell phones with the screen 12 serving as a view finder.

An audio capturing subsystem is built into the MMR, one input of which is the microphone 4. A socket 5 is provided for an extension microphone or for the output from a sound recorder. The socket 5 is activated by pressing pushbutton 3. The start and end times of these audio recordings are recorded by noting when pushbutton 3 is used. In a preferred embodiment of the invention the microphones used are of the unidirectional type in order to help exclude noise resulting from the other student voices in a MMR Interactive Group Response System located in a classroom. Unidirectional microphones of the cardioid types, are known to have unwanted background noise (or interference) elimination characteristics of up to 80 db.

One end of the case of the basic unit 19 is extended at 28, in order to accommodate an antenna as part of an 802.11 wireless local area network (WLAN), communication. In a preferred embodiment this communication system is used in a classroom to form an Interactive Group Response System, where each student has a MMR, which can communicate with the teacher's station which includes a computer. In the case where students are located remotely from the teacher's station, the antenna can be part of a wireless Internet communication system.

In Social Mode operation of a MMR Interactive Group Response System, students respond contemporaneously to the same question. When the students are located in the same room as the teacher, the question is posed by the teacher either verbally or via a Class Display. However when individual students are located remotely from the teacher and each other, information and questions are presented via each individual student's MMR screen 12 and via the earphone socket 6 or via a built in speaker, with the help of an Internet communication system.

In Self-paced Mode operation of a MMR Interactive Group Response System where students work at their own pace, students make use of the Send key 2 in order to receive the next frame after responding to the question in the current frame. The next frame may not necessarily be the numerically following frame if the lesson is of the Branch type where the next frame number depends on the response to the current frame. Alternatively the student can indicate a particular frame number on the keypad 8. The frame appears on each MMR screen 12 and may be heard via earphone socket 6. The earphone socket 6 is needed here when several students are working in Self-paced Mode and are located in the same room in order not to disturb each other, since students probably listen to the audio recordings of different frames at any particular time.

The teacher can use a MMR for authoring a lesson in numbered frames, by hand writing and/or hand drawing using electronic pen 13 on surface 20 and/or by typing using the keypad 8, and/or by the use of microphone 4 or by making some other audio recording via socket 5. Each set of graphic and/or audio files, including any question created pertaining to each frame, is transferred by the teacher to the teacher's computer at the teacher station, using the Send key 2 of the teacher's MMR, as will be explained with reference to FIG. 5.

Figure 2B:
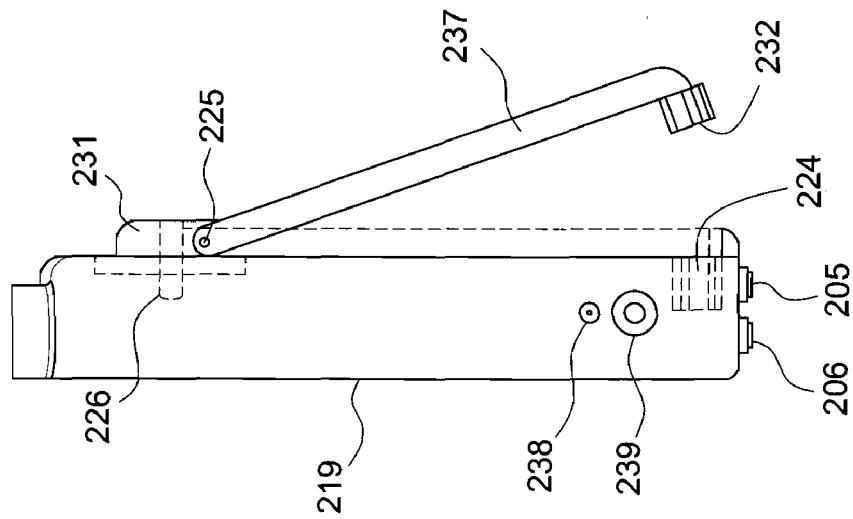
FIG. 2b shows the side view of FIG. 2a where a manually operated generator is used to avoid requiring periodic recharging of a battery from an external electrical power supply.
Figure 2A:
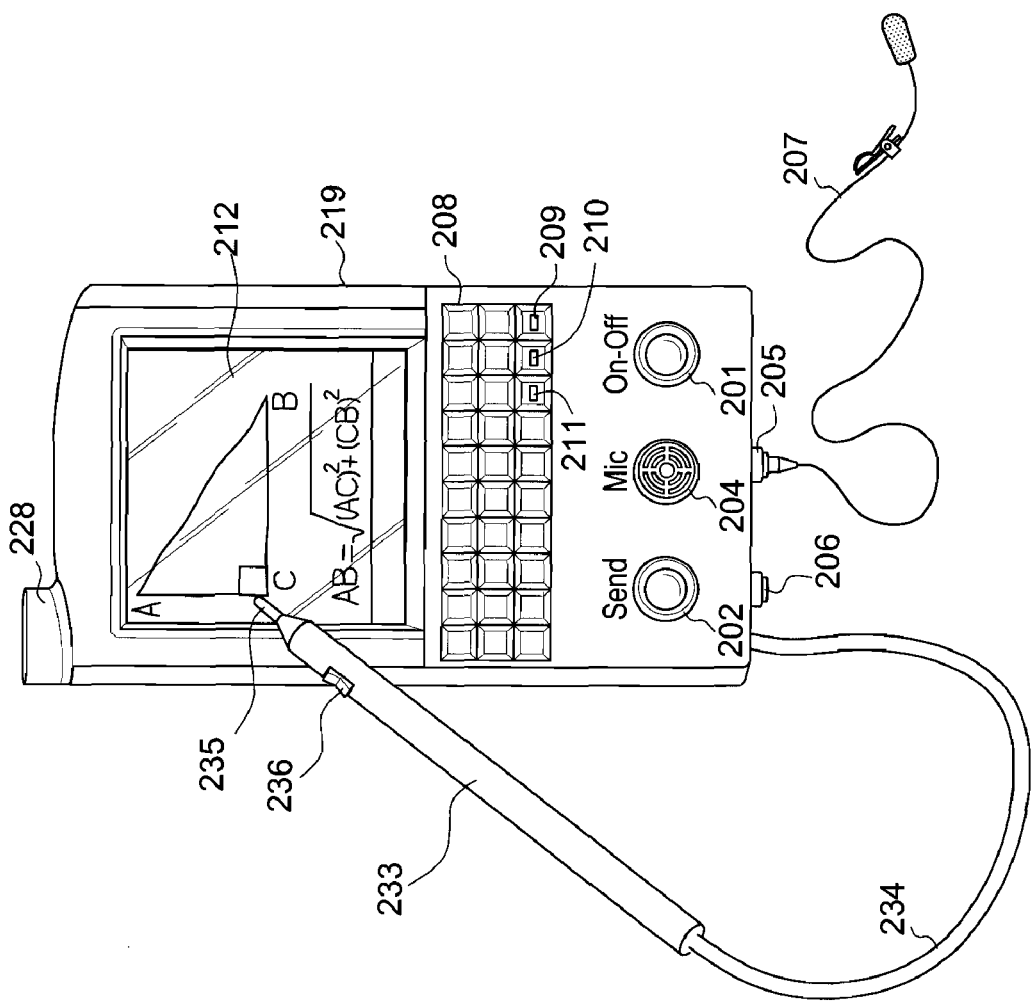
FIG. 2a shows the front view of another embodiment of a MMR, which includes an LCD display screen with an electronic pen for writing directly on the screen of the MMR.

FIG. 2a shows the front view of another embodiment of a MMR according to the invention, where an electronic pen is used to write directly on an LCD screen. See previously cited U.S. Pat. Nos. 5,754,169 and 6,906,694. In FIG. 2a the basic unit 219 has a power on-off switch 201, an LCD screen 212, a keypad 208, a microphone 204, a Send key 202, an extension microphone socket 205 with a clip-on microphone 207 and an earphone socket 206. Keys 209, 210 and 211 on the keypad 208, like keys 9, and 11 in FIG. 1, serve functions such as to erase the last pen stroke on the screen 212 and to affect functions such as editing the color and thickness of a line drawn using electronic pen 233, or to key in the number of a frame one wishes to access when working in Self-paced Mode. The antenna housing 228 holds an antenna as part of an 802.11 wireless local area network (WLAN) communication system. In the case where students are located remotely from the teacher's station, the antenna is part of a wireless Internet communication system.

The electronic pen 233 is connected to basic unit 219 by the cable 234 which, as stated above, enables writing directly on the screen 212. When writing a message or drawing an image on screen 212 according to the invention, the location of the pen tip 235 during a stroke, as a function of time, is recorded. Also recorded are the start and stop times of each stroke according to when the pressure sensitive micro-switch, which is located in the body of the pen in line with the tip of the pen 235, is switched on and off. This path information is normally recorded in the basic unit 219 and eventually transmitted via antenna 228 on a stroke-by stroke basis or it can be on a segment-by-segment basis if periodic sampling is built in for this purpose.

An on-off switching pushbutton 236, for operating microphone 204 or 207, is placed on the electronic pen 233, where it is normally operated by the forefinger of the hand holding the pen, so that a graphic notation and a verbal explanation can conveniently be carried out concurrently. The audio from microphone 204 or 207 is recorded and the start and end times are noted according when pushbutton 236 is operated on and off respectively. If desired, pushbutton 236 can also be used to record voice input while pressing keys on keypad 208 or while using a handheld scanner which is plugged into socket 238 in FIG. 2b, as will be described.

FIG. 2b is a side view of the MMR basic unit 219 shown in FIG. 2a which in one embodiment of the invention is designed to minimize the need for periodic charging of rechargeable batteries from an external electrical power supply such as electrical wall outlet. In Social Mode operation, when each student uses a MMR only for responding to a question, power consumption is relatively low for one response. In Self-paced Mode, if students may want to recall a previous response in order to modify it, it can be recalled from the computer at the teacher's station by keying in the number of the relevant frame using the keypad 208 in FIG. 2a. There is therefore no particular need in a MMR for storing a large amount of data i.e. all the student responses simultaneously. Therefore for these modes of operation the power requirements for the operation of the MMR are limited and this makes possible the periodic use for a few seconds of a hand operated power generator. Thus by lifting the arm 237 in FIG. 2b around pivot 225 until arm 237 is vertically up, the arm 237 together with rotor 231 of a power generator, can be rotated through 360 degrees several times on axial pin 226, in order to recharge a power storage means such as a rechargeable battery, without the need for an external electrical power source. In order to rotate the arm 237 one grips knob 232 which normally rests in recess 224.

As in the case of FIG. 1, in addition to producing an image on the MMR screen 212 using an electronic pen 233, the output of graphic information capturing apparatuses such as a handheld scanner or a document camera can be fed into a MMR through sockets such as 238 and 239 in FIG. 2b. Alternatively, as mentioned with respect to FIG. 1, a handheld scanner can be built into one side of the MMR and a document camera can be built into a MMR in the same way as cameras are built into cell phones with the screen 212 possibly serving as a view finder.

Figure 3:
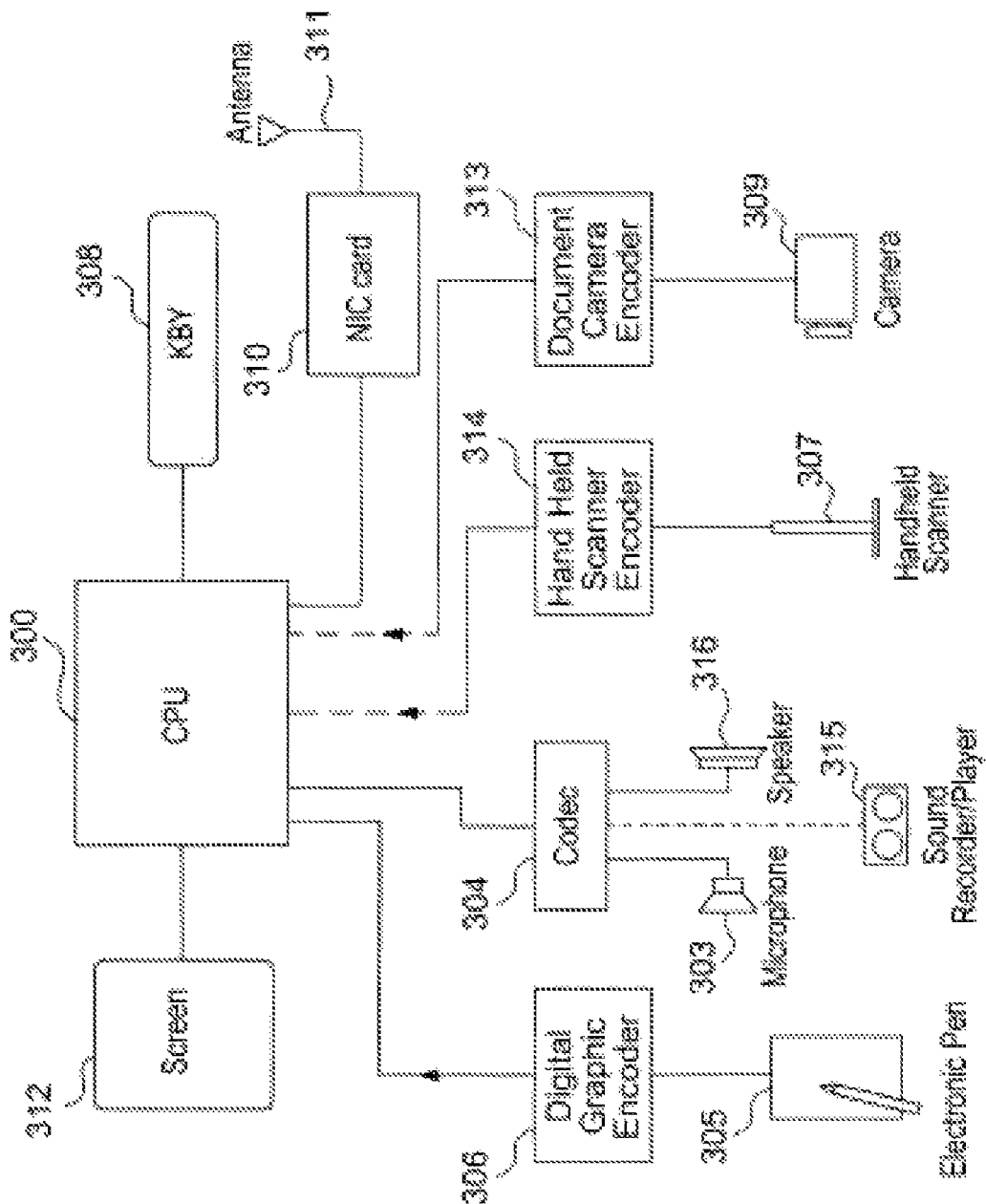
FIG. 3 shows an electronic block diagram of a MMR.

FIG. 3 shows an electronic block diagram of a MMR. The CPU 300, includes a block of memory and a clock for recording the times of the inputs into memory from several devices. The primary input devices are keypad 308, electronic pen 305 and microphone 303. The electronic pen representation 305 is part of a writing assembly as described in FIG. 1 or 2. The screen is represented by 312 in FIG. 3. The built on speaker or earphone socket 6 in FIG. 1 or 206 in FIG. 2a is represented by 316 in FIG. 3.

Other graphic input sources are possible such as a handheld scanner 307 or document camera 309 as mentioned with reference to FIGS. 1 and 2 (i.e. sockets 238 and 239 in FIG. 2b), where a student is requested to illustrate a response with a copy of a graphic image from, say, a book. Another sound input source is sound recorder/player 315.

The input from electronic pen 305, which occurs stroke-by-stroke or segment-by-segment, is via a digital graphic encoder 306. The handheld scanner 307 and document camera 309 are also provided with encoders, 314 and 313 respectively. Microphone 303, sound recorder/player 315 and speaker/earphone-socket 316 use an encoder-decoder 304 (also referred to as a Codec) since the decoder aspect is needed when the MMR using 316 is required for producing sound information received via antenna 311.

Antenna 311 is connected via interface card 310 known as a NIC (Network Interface Controller) card to CPU 300. A NIC card can connect to both a WLAN using an 802.11 protocol and the Internet. In the case of the 802.11 protocol, the input/output features to and from antenna 311 is similar to a MAC/PHY interface as it is known in the art. The MAC part is the unique identifier address of the MMR while the PHY refers to the Physical layer to which it is connected. Thus the terminal can both send and receive information via antenna 311. For Internet the NIC card 310 uses the antenna 311 to communicate wirelessly either with a wireless access point or with neighboring terminals and this enables the terminal to ultimately communicate with the TCP/IP server of the Internet.

From the various input sources including keypad 308, electronic pen apparatus 305 and microphone 303 and if graphic information capturing apparatuses such as handheld scanner 307 and camera 309 are used as well as the input from a sound recorder/player 315, a series of files are created and transmitted via antenna 311 to the teacher's computer, as will be explained with reference to FIGS. 4 and 5.

The input to CPU 300 in FIG. 3 which originates from keypad 308, and represents 8 in FIG. 1 or 208 in FIG. 2, is used for both an alpha-numeric input and for control functions. For example, it is used by students responding to the teacher when responses can be typed and must be evaluated automatically since the technology for handwriting character recognition and voice recognition is less reliable. Ideally the characters are transmitted character-by-character to the teacher's computer so that the teacher can read the responses while the responses are being constructed. The time of each keystroke is also noted particularly for the case when the student comments verbally on what the student is typing.

The input to CPU 300 in FIG. 3 which originates from block 305, represents writing or drawing with the electronic pen 13 in FIG. 1, or electronic pen 233 in FIG. 2a. By means of the digital encoder 306 a digital graphic file is created and ideally transmitted with every pen stroke and the times are noted. The file notes the x and y position of every significant pixel affected.

The input to CPU 300 in FIG. 3 which originates from block 304, represents the incoming audio input from microphone 4 in FIG. 1 or 204 (or extension microphone 207) in FIG. 2a or the sound recorder/player 315. By means of the digital audio encoder 304 a digital audio file is created every time key 3 in FIG. 1 or key 236 in FIG. 2a is pressed for starting an audio recording from the microphone and then released on ending the recording.

The inputs from electronic pen 305, handheld scanner 307 and camera 309 are not required to be used simultaneously, since these devices all require manual operation and hence the connections from encoders 314 and 313 to CPU 300 are also shown as broken lines.

There is however a need to make a voice recording using microphone 303 while contemporaneously using one of these manually operated devices, in particular electronic pen 305. This is particularly true when constructing responses in subjects involving complex multi-step expressions or when making sketches in technical subjects, where an accompanying verbal explanation with each step helps to clarify the steps. CPU 300 must therefore normally be able to accept inputs from two digital sources simultaneously, viz. an audio source (encoder 304) and one of the graphic sources, particularly the electronic pen encoder 306, and then store the inputs in the form of files in memory. The times that the audio and graphic files are created may overlap in different ways, one example of which is shown in FIG. 4.

Figure 4:
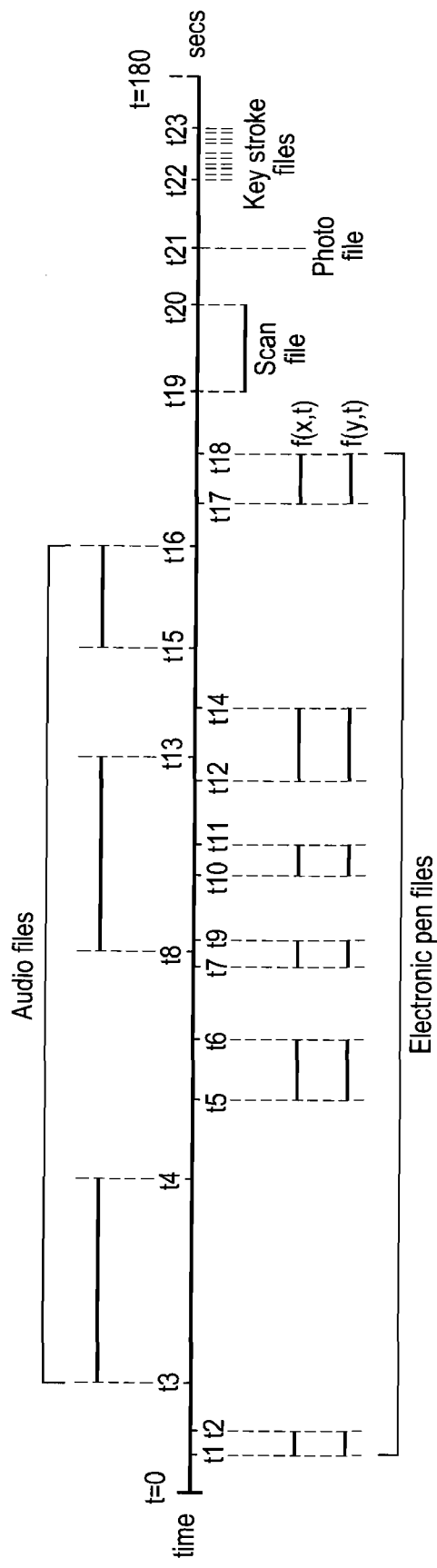
FIG. 4 is a schematic representation of the history of various graphic and audio files created using a MMR.

FIG. 4 shows an example of the history of various files created while a student is responding using a MMR. It is shown on a timeline which starts at time t=0 and ends at t=180 seconds.

Electronic pen files. As explained with reference to FIG. 1, the path of the tip of the pen 13 in FIG. 1 or tip 235 in FIG. 2a, for each pen stroke, whether it arises from writing or drawing, can be obtained by different means. Each pen stroke occurs over a period of time and the path itself can be described in terms of the x and y rectangular coordinates of the pen tip. Therefore the pen stroke of an electronic pen as a function of time is expressed by the pair of digital files which represent the f(x,t) and f(y,t) functions. In FIG. 4 six pen strokes, in the form of six pairs of files, are illustrated below the timeline, between the times t1 to t2, t5 to t6, t7 to t9, t10 to t11, t12 to t14 and t17 to t18.

Audio files. In FIG. 4 a set of three voice audio files are shown above the timeline, between the times t3 to t4, t8 to t13 and t15 to t16. Note that there is no special time relationship between the electronic pen files and the audio files which were created when the student was commenting verbally while using the electronic pen. Thus the first two pen strokes t1 to t2 and t5 to t6, as well as the last pen stroke t17 to t18, do not overlap in time any voice audio files; however pen strokes t7 to t9 and t12 to t14 partly overlap the second voice file t8 to t13, whereas pen stroke t10 to t11 occurs totally within the time duration of the second voice file, t8 to t13.

Handheld scanner file. In FIG. 4 the scanner file was created between times t19 and t20 and there is no accompanying audio file.

Photo File. The file created by the camera 309 in FIG. 3 can appear on the timeline like the scanner file in FIG. 4, however it being produced by a camera the time duration is relatively short compared to time t19 to t20 and therefore is shown schematically as a single line at time t21.

Keystroke files. As shown in FIG. 4, the user also pressed several keys on the keypad 308 in FIG. 3, which are shown registered as keystrokes between the times t22 and t23.

Figure 5:
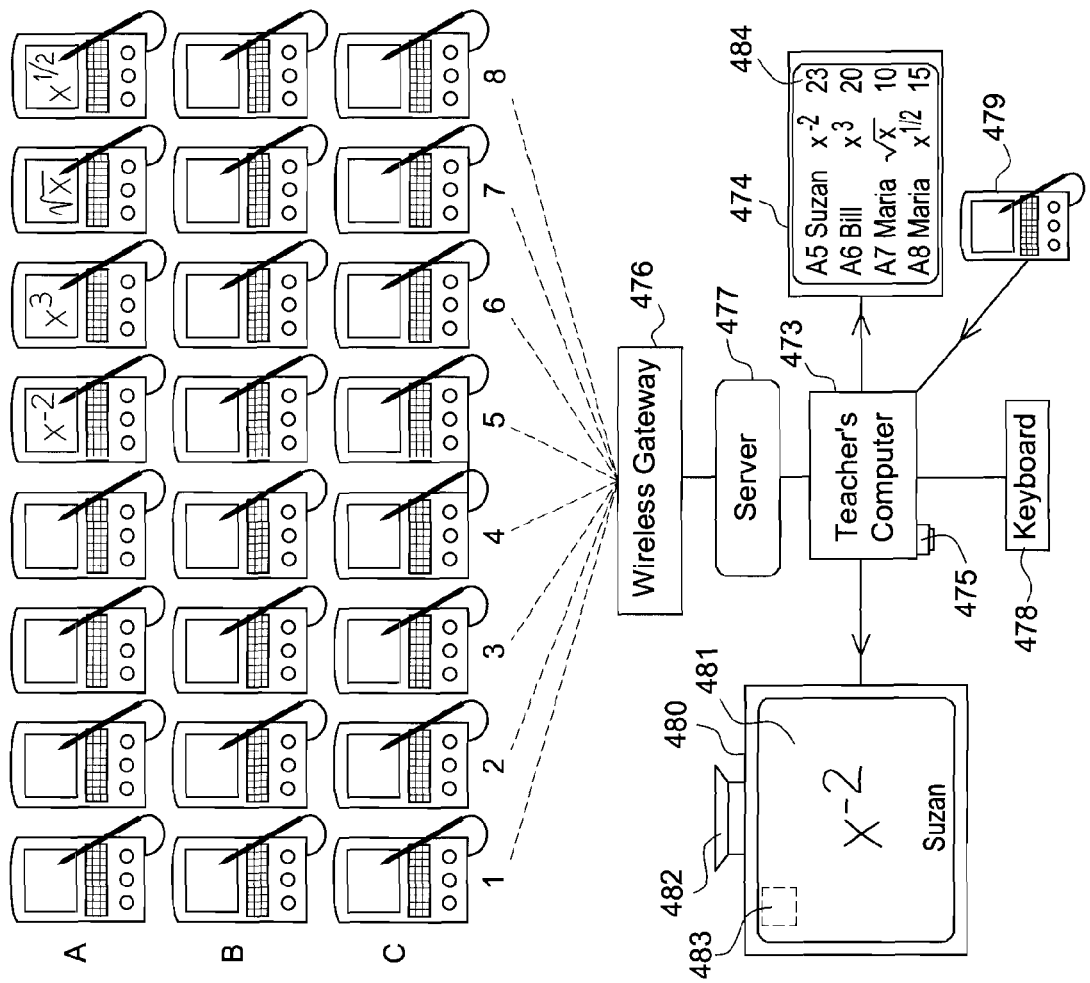
FIG. 5 is a schematic representation of a MMR Interactive Group Response System showing a MMR for each student in communication with a teacher's station.

The transfer of the streams of data shown in FIG. 4, to the teacher's computer memory on an ongoing basis, as is described with reference to FIG. 5, is done by multiplexing. One form of multiplexing is known as TDM (Time-Division Multiplexing) technology. TDM is a technique of transmitting multiple digitized data, such as voice and video signals, simultaneously over one communication medium by interleaving pulses representing bits from different channels or time slots. In the present case the sizes of the audio bit stream arising from a voice and the sizes of the graphic bit stream arising from individual pen strokes with reasonable resolution, is relatively small compared to the channel capacity of an 802.11b or 802.11g protocol which uses the 2.4 GHz band.

Reproduction times. Any graphic and audio input to a MMR when used in a MMR Interactive Group Response System to be described with reference to FIG. 5, can be reproduced locally at each MMR when working in Self-paced Mode by recalling it from the computer memory at the teacher's station at the rate at which they were created because both the time of creation of files has been noted as well as the rate at which each was created. However, "dead" periods, such as those at which there is no voice or pen stroke recording, can be eliminated and therefore reproduction can be speeded up. "Dead" periods are periods of coincident hesitation of audio and graphic recording. Examples of "dead" periods in FIG. 4 are periods t2 to t3, t4 to t5, t6 to t7, t14 to t15, etc. This has the advantage that the time to hear and/or see a student's response is shorter than the original, since all hesitations by the student can be eliminated. Indeed, in the absence of audio during pen strokes, such as those created in the periods t1 to t2, t5 to t6 and t17 to t18, the relevant pen strokes can optionally also be reproduced at a much faster rate than when they were created. Using this technique saves lesson time when displaying a student's response on the Class Display 480 described in FIG. 5, by resulting in a faster display of the purely graphic part of a student's response without losing coherence in the part where audio is present.

FIG. 5 is a schematic representation of a MMR Interactive Group Response System in one embodiment of the invention. The teacher's station includes a teacher's computer 473 with keyboard 478 for operating the system, a teacher's screen 474 and a Class Display unit 480. The MMRs are located in three rows marked A, B and C, and eight columns numbered 1 to 8, so that each MMR may be referred to by its location A1, A2, A3, etc., B1, B2, B3, etc.

The Class Display unit 480 comprises a large screen 481 and speaker 482. The Class Display unit 480 is used for projecting and/or hearing frames of lesson material and questions. It is also used for projecting and/or hearing the response of any student that the teacher designates, so that the teacher as well as all the students in the class can view and/or hear it and, if desired by the teacher, comment on it.

The MMRs communicate via a wireless gateway 476, using a standard wireless protocol such as 802.11. As stated with reference to FIG. 3 each MMR has a unique identifier, e.g. in 802.11 each device has a unique MAC address, which is used to distinguish it from the others. The teacher computer 473 is connected to the gateway 476 through the server 477.

The networking framework for implementing the system communication protocols used in a preferred embodiment is known to those skilled in the art as OSI (Open System Interconnection) Layer 2 connectivity. As an alternative to communication between the MMRs and the teacher's computer 473 by sending 802.11 protocol frames, higher layer protocols can be used, such as TCP/IP. In the latter case, which is the Internet communication protocol, each MMR could have its own connection or set of connections with the TCP/IP server, i.e. different types of digital data, such as pen strokes, voice recording, and keystrokes, could be transmitted over the same connection or have separate connections.

The teacher's screen 474 in FIG. 5 shows schematically the electronic pen input of four students Suzan, Bill, Maria and David in locations A5, A6, A7 and A8, together with the duration of each of their voice or audio inputs at this point in time, viz. 23, 20, 10 and 15 seconds respectively. These times appear in a column 484 headed Audio and by clicking on any of these times the audio can be heard by the teacher via earphones or a low volume speaker plugged into socket 475. For the whole class to see and hear a student's response use is made of the Class Display 480 as explained below.

Figure 6:
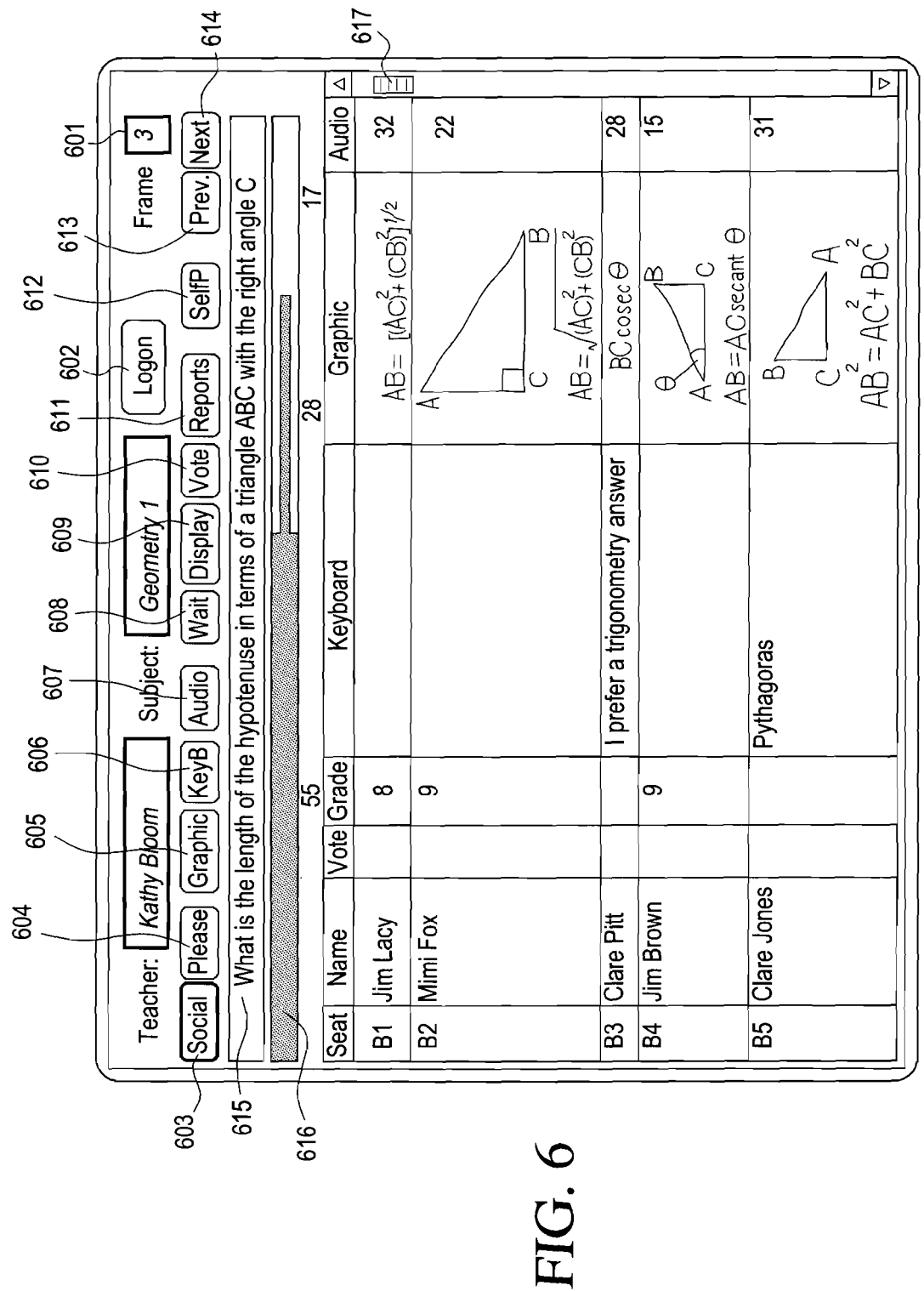
FIG. 6 is a Social Mode Dynamic Responses screen and shows an example of student responses on the teacher's screen at a particular instant of time, of a MMR Interactive Group Response System.

A more precise representation of the teacher's screen 474 in FIG. 5 for Social Mode operation is shown in FIG. 6 below. By clicking on a virtual key marked Display (609 in FIG. 6), followed by clicking on a student's name, such as Suzan, on screen 474 in FIG. 5, Suzan's graphic response, including the name "Suzan", appears on Class Display screen 481 in FIG. 5 and Suzan's Audio can be heard on Class Display speaker 482. If desired Suzan's picture, which is pre-recorded, may appear in block 483 on the Class Display, particularly as a reward for a correct response for younger children. Alternatively, by clicking on the virtual key marked Display followed by clicking on Suzan's response on the teacher's screen 474, Suzan's response, will appear anonymously on Class Display screen 481, and the teacher may then invite the other students to comment on the response without them being fully aware of whose response it is. (The teacher may at this stage turn off the speaker 482 on the Class Display 480 to avoid the other students possibly recognizing the voice).

A Class Display is most suitable when a common message needs to be sent to all the students which are located in the same room. On the other hand messages are sent directly to the MMR of each student when students need to be notified of the correctness of their responses.

Optionally, included in the teacher's station shown in FIG. 5 is a MMR, 479. The teacher can use the MMR to create a lesson in the form of a set of frames, including questions, to be displayed on the Class Display. The frames containing pen strokes, voice recording and keystrokes, and if desired also inputs from a handheld scanner and sound recorder/player, are created as if they were student responses. Each frame, including any question created pertaining to the frame as well as the maximum grade that can be awarded for the question, is transferred by the teacher to the teacher's computer at the teacher station, using the Send key (2 in FIG. 1 or 202 in FIG. 2*a*).

Having constructed all the frames relating to a lesson, the teacher may next proceed to place the system, via the teacher's computer, into Social Mode or Self-paced Mode and proceed to teach accordingly.

As explained with reference to FIGS. 1 and 2, when working in Self-paced Mode each student after viewing the current frame and completing the response to the question, if any, in the current frame, makes use of Send key 2 in FIG. 1 (or 202 in FIG. 2*a*) in order to receive the next frame, whereas in Social Mode the teacher advances all the students in the group simultaneously to the next frame. The teacher determines the Mode of operation, whether Social or Self-paced, by either designating two of the function keys on keyboard 478 in FIG. 5 as Social and Self-paced, or by selecting the relevant virtual keys displayed on the screen 474 in FIG. 5, as explained with reference to FIG. 6. By these means a flag is set or cleared in the memory of computer 473 which effectively disables the Send keys of the students' MMRs in Social Mode as well as the keys which enable a student to choose a frame number which is different to that which the teacher directs the class.

FIG. 6 is a Social Mode Dynamic Responses screen and shows in greater detail than 474 in FIG. 5, an example of student responses on the teacher's screen during Social Mode operation, at a particular instant of time, in a MMR Interactive Group Response System.

On logging on to the system by the teacher a screen appears enabling the teacher's name and the subject which here is Geometry I, to be entered and the Social Mode Dynamic Responses screen shown in FIG. 6 to be selected. The teacher then indicates the current frame number desired in the space 601 and operates the virtual keys as follows, resulting in the students responses in the form of an organized sequence of the separate graphic notations and duration of audio responses being shown in real time below.

Logon—Clicking by the teacher on this virtual key 602 enables students to log on by entering their names and optionally also their location or seat numbers where seat positions are fixed in the classroom.

The second line from the top in FIG. 6 shows a row of virtual keys indicating the operating options available to the teacher. These options include, from left to right:

Social—This virtual key 603 places the system in Social Mode and addresses all the students' MMRs to the frame number indicated in the Frame fill-in space 601. It is represented in FIG. 6 differently from the other virtual keys to indicate that it has been selected by appearing emphasized. In practice is highlighted.

Please—In Social Mode, pressing the Please key 604 is accompanied by an audio signal, e.g. a ring, or the spoken words "Please respond". This requests the students in the group to immediately respond via their MMRs to the question associated with the current frame (which in FIG. 6 is shown as 615), or to a question spontaneously asked by the teacher. The students respond and their responses become immediately available to the teacher as they are entered, as described below. The students are free to respond on their MMRs by any combination of means, including electronic pen, keypad or microphone, unless restrictions are programmed into the frame or the teacher presses one of the following three keys after the Please key 604:

Graphic—This key 605 sends a signal to the students, e.g. by a voice announcing "Pen", that only an electronic pen response is desired for the particular question.

KeyB—This key 606 sends a signal to the students that only a keypad response is desired.

Audio—This key 607 sends a signal to the students that only an audio response, usually a verbal response, is desired.

Wait—This key 608 places the MMRs out of operation in a "wait" mode.

Display—Clicking on the Display button 609 followed by clicking on the frame number shown in the space 601 marked Frame, will display on the Class Display 480 in FIG. 5, the actual frame (including audio) with the question, if any. Also, as explained with reference to FIG. 5, clicking on the Display button 609 followed by clicking on a student's name in FIG. 6, such as Mimi Fox, Mimi Fox's response, including the name "Mimi Fox", appears on the Class Display and Mimi Fox's Audio can be heard by all in the class. If instead of clicking on a student's name one clicks on the student's response, Mimi Fox's response is displayed anonymously.

Vote—This key 610 enables students to express preferences on a numerical scale. The preference appear in the column marked Vote.

Reports—This key 611 results in a drop-down menu enabling various reports on student performance to be printed for the teacher. The reports available are described with respect to FIG. 9.

Self-P—This key 612 places the system in Self-paced Mode, described in FIG. 7, which allows the students to independently select to which frames to respond. The student makes use of the keypad 8 in FIG. 1 or 208 in FIG. 2b to choose the frame number Prev. —This key 613 reduces the frame number appearing in space 601 by 1.

Next—This key 614 increases the frame number appearing in space 601 by 1.

The third line 615 shows the actual question to which the students should respond.

Below the third line is a bar graph 616 representing either a voting response Y(yes), N(no) and Unanswered, or a grading result for the group as a whole. The digital values of the bar graph are shown below the bar graph 616 as 55%, 28% and 17%. The grading result is derived from grades automatically or manually awarded for a particular question.

The rest of the screen in FIG. 6 shows the actual responses of five students. The left hand column marked Seat shows the seat numbers of the five students. Moving the slider 617 down on the right side of the screen moves the display up revealing the responses of more students. Alternatively, by pressing the spacebar on the keyboard 478 of the teacher's computer in FIG. 5, the input of the next set of students B6, B7, B8, C1 and C2 (or as many as will fit legibly on the screen) are displayed. By typing a particular position, say C3, the inputs of another set of students, starting with C3 are displayed.

The screen in FIG. 6 is divided vertically into columns which are headed:

Seat—Seat number as entered on log-on by the student.
Name—Name of student.
Vote—Student's choice on a numerical scale when voting on a subject posed by the teacher. Y(es) and N(o) are allocated 1 and 0 respectively.
Grade—Grade awarded automatically or manually by the teacher. Manual grading is described with reference to FIG. 9.
Keyboard—Student input via keypad or keyboard.
Graphic—Electronic pen input or handheld scanner or camera input by student.
Audio—Duration of student's audio recording in seconds.

The students' responses, keypad, graphic and audio, are automatically graded against the teacher's stated criteria in the lesson program, to the extent that current technology enables it. Alternatively, if required, the teacher can grade the responses manually as explained with reference to FIG. 9.

From FIG. 6 it is seen that apart from audio input, the student Jim Lacy in seat B1 has so far only given a purely algebraic response, while Mimi Fox in seat B2 has given both an algebraic and a geometric response. Clare Pitt in seat B3 gave a response in trigonometry terms as well as having typed a message "I prefer a trigonometry answer" as can be seen in the Keyboard column, but has not shown a drawing of the relevant triangle. At this stage the teacher could tell Clare Pitt to show the triangle and identify the angle to which the cosec function refers. Alternatively, the teacher could click with the mouse on the name Clare Pitt and then on the Display button 609 and the class could possibly hear Clare Pitt's verbal explanation via the Class Display speakers, how the angle Theta is related to a triangle ABC. The length of this explanation is known ahead of time since it is shown in the Audio column to be 28 seconds.

FIG. 7 is a Self-paced Mode Dynamic Responses screen and shows an example of student responses at a particular instant of time on the teacher's screen during Self-paced Mode operation, after the teacher pressed the SelfP button 712 which here is shown emphasized and in practice is highlighted. The subject here is Calculus II as seen in block 720.

Being a Self-Paced lesson, different students are likely to work on different frames unlike the case in FIG. 6 where all students are work on the same frame 3.

The screen resembles FIG. 6 except that since the frames are preprogrammed with an indication as to which combination of Keyboard, Graphic and Audio the students should use in their responses, the three relevant keys which are present in FIG. 6, are not required in FIG. 7. Should the teacher want to display a student's response on the Class Display 480 in FIG. 5, the system can temporarily be switched to Social Mode via virtual key Social 703 in FIG. 7.

The frame number 701 in the top line of FIG. 7 shows 5, which is selected by the teacher in order that part of frame 5 should appear in the third line 715. This serves as a reminder to the teacher as to what is the question that a particular student who is working on Frame 5, such as Bill Lance in seat C3, is currently responding to. Unlike in Social Mode in FIG. 6, the changing of a frame number by the teacher does not affect the frames that the students' choose to work on.

As stated with respect to grading in Social Mode in FIG. 6, the grades which appear in the "Grade" column 719 are awarded manually by the teacher if the technology for automatic grading is not available. This is more likely to occur with hand written, drawn or audio responses, than with typed responses. Also here various reports on student performance are available via the Reports 711 drop-down menu. One item on the menu relates to manual grading as can be seen in FIG. 9.

FIG. 8 shows an example of the raw data that is accumulated in the teacher's computer 473 in FIG. 5 for each student concerning the times taken and grades achieved by the student while responding via electronic pen strokes, keystrokes and audio.

In FIG. 8 the top line shows the name of the student, the subject taught and the date. The columns are headed:

| Frame No. | This column shows the frame number containing the question. |
|---|---|
| Attempts | This is the number of fresh attempts the student made for answering the question in the frame. |

There next follow five columns showing the time in seconds, as derived from FIG. 4:

| total | total time taken to respond to the question. |
|---|---|
| to start | total time taken to start writing, typing and/or speaking (or other graphic or audio input), i.e. includes all waiting or hesitation. In Social Mode the time is measured from instant teacher clicks Please key 604 in FIG. 6. In Self-paced Mode time is measured from instant student presses Send key 2 in FIG. 1 or 202 in FIG. 2a. |
| to write | time taken for the hand written or hand drawn part of the response. |
| to type | time taken for the typed part of the response. |
| audio | time taken for the audio part of the response. |

The next two columns concern grades:

| max | max grade possible for the question. |
|---|---|
| given | grade obtained by student, as appearing in the Grade columns on FIGS. 6 or 7. |

It is noted that the figure appearing in the "total" column may be less than the sum of the times appearing in the other four time columns, viz. "to start", "to write", "to type" and "audio" columns, since graphic and audio times can overlap, such as when a student speaks while writing or drawing.

From FIG. 8 various reports on the performance of each student can be generated, some of which are listed in the Reports drop-down menu in FIG. 9.

FIG. 9 shows the Reports drop-down menu on the teacher's screen, referred to with respect to FIGS. 6, 7 and 8. The items in the menu include:

Manual Grading. In the absence of automatic grading, the teacher can award a grade for a student response by clicking on this item followed by clicking in the Grade column in FIG. 6 or 7 opposite the student's name and then typing the grade being awarded. If no maximum grade was specified when the lesson or test was constructed, 10 is assumed.

Summarized Student Report. This report shows the performance of each student on the test or lesson as a whole, expressed as a percentage of the maximum possible, as well as the times taken. An example is shown in FIG. 10.

Summarized Question Report. This report shows the performance of the group as a whole on each question, expressed as a percentage of the maximum possible, as well as the average times taken by the group as a whole.

Individual Student Report. This report shows the performance, including grade and times taken, of each student on each question. An example is shown in FIG. 11.

Detail Report. This report shows the grade of each student on each question.

Dynamic Responses. This returns the screen to FIG. 6 or 7 whichever was exited last.

FIG. 10 shows an example of a Summarized Student Report, referred to in the Reports drop-down menu of FIG. 9, for the group of students being taught. The report is generated from the raw data for each individual student shown in FIG. 8. The headings in FIG. 10 show the subject taught, the name of the teacher as well as three virtual keys:

| Save - | This saves the Report to memory. |
|---|---|
| Print - | This prints the report. |
| Responses - | This returns the screen to the prior Dynamic Responses state of FIG. 6 | or FIG. 7.

The columns in FIG. 10 are headed:

| Name | Name of student |
|---|---|
| Grade | Overall grade as a percentage awarded to the student based on the grades in FIGS. 6 or 7. |

There next follow five columns that summarize the times taken:

| total min. | total time taken in minutes. |
|---|---|
| start % | percentage of total time taken to start writing, typing and/or speaking (or other graphic or audio input), i.e. includes all waiting or hesitation. |
| write % | percentage of time taken for the hand written or hand drawn part of the responses. |
| type % | percentage of time taken for the typed part of the responses. |
| audio % | percentage of time taken for the audio part of the response. |

It is noted that the sum of percentages in the last four columns sometimes exceed 100% because the percentage indicated for audio includes both a pure audio response unaccompanied by any graphic input and audio which accompanies writing such as when a student speaks while writing.

FIG. 11 shows an example of an Individual Student Report, referred to in the Reports drop-down menu of FIG. 9. It is based on the raw data shown in the table of FIG. 8. In FIG. 11 the individual hesitation and execution times are shown as percentages. The Individual Student Report is of particular interest in the field of experimental psychology where mental chronometry testing is conducted on an individual person for measuring parameters like reaction and execution times. Thus, for example, the lower rows of FIG. 11 show the results for the particular test (out of 10 tests) conducted on the person named at the top of the table. Here the "start %" taken as a percentage of the "total min." may be considered as the reaction time while the sum of the percentages in the other three columns may be considered as the execution time.

With the present invention the range of testing is increased while a tester can conduct such tests on more than one person at a time.

It is seen that the teacher's computer 473 in FIG. 5 is used for recording both the students' responses as well as the lesson authored by the teacher thereby creating a record of the performance of both students and the teacher, which enables teaching authorities, to recommend corrective action where necessary.

REFERENCES CITED

U.S. Patents

U.S. Pat. No. 5,263,869
U.S. Pat. No. 5,437,555

U.S. Pat. No. 6,302,698
U.S. Pat. No. 6,898,411
U.S. Pat. No. 4,012,588
U.S. Pat. No. 4,246,439
U.S. Pat. No. 5,637,839
U.S. Pat. No. 5,754,169
U.S. Pat. No. 6,625,314
U.S. Pat. No. 6,724,371
U.S. Pat. No. 6,876,356
U.S. Pat. No. 7,249,716

Commercial Software and Products Cited

Docupen by Planon Systems.
Cintiq by Wacom Technology Corporation.

Other Sources

Wikipedia Time-Division Multiplexing.

The invention claimed is:

1. An electronic educational system serving a teacher and at least one student comprising:
   a student terminal for each student, each student terminal including graphic notation forming means comprising an electronic pen and a set of alpha-numeric keys, each student terminal also including a display usable to provide concurrent representations of response inputs from that student, each such student terminal being usable to display handwritten graphic components of the student response inputs and entered on the display by use of the electronic pen, together with alpha-numeric components of the student response inputs and entered on the display by use of the set of alpha-numeric keys;
   a teacher's station including a computer and screen and network communication connections to receive and to concurrently display the graphic component and the alpha-numeric component inputs of the response from each of the students received in real time, and to provide lesson and question data input to each student terminal;
   a communication network coupling each student terminal to the teacher station for bi-directional exchange of data; and
   audio communications means at each of the student terminals and the teacher's station, the audio communications means being operable contemporaneously with the graphic notation means and wherein a time duration of an audio input of each student terminal is displayed on the teacher's screen on an ongoing basis.

2. The system of claim 1, wherein the teacher station screen includes means for concurrently displaying in organized sequence the separate graphic notations from each of the students.

3. The system of claim 1, wherein the rate of communication of the graphic notations at the terminal of each student to the teacher's station is stroke-by-stroke.

4. The system of claim 1, wherein the rate of communication of the graphic notations from the electronic pen to the teacher's station is segment-by-segment.

5. The system of claim 1, wherein each student terminal further includes a handheld graphic information capturing apparatus.

6. The system of claim 1, wherein the communication protocol for the graphic and audio data inputs to the teacher's station employs multiplexing circuits enabling contemporaneous communication of the graphic notation and audio input data.

7. The system of claim 1, wherein the audio communication means of each student includes a unidirectional microphone.

8. The system of claim 1, wherein the teacher's station further includes program approved responses for any combination of graphic notation inputs, including handwriting, hand drawing and typing, and comparison means for indicating the correct graphic notation inputs.

9. The system of claim 1, wherein the teacher's station further includes program approved responses for musical sound input, and comparison means for indicating correct audio input responses.

10. The system of claim 1, wherein the computer at the teacher's station includes program instructions for converting the manual entry of a symbol by the teacher on the computer screen opposite the name of a student into the grade to be awarded for the student's input.

11. The system of claim 10, wherein the computer at the teacher's station includes program instructions for communicating grading information to the student terminals.

12. The system of claim 1, wherein the teacher station includes a class display placed in the class where students are located and which is in communication with the computer at the teacher station for reproducing inputs including those originating from a student terminal on a scale perceivable by all the students in the class.

13. The system of claim 12, wherein the graphic notations that are unaccompanied by audio are reproduced at a faster rate than when created on the student terminal.

14. The system of claim 12, wherein periods of coincident hesitation of both graphic and audio inputs on student terminals larger than a specified duration, are eliminated when reproduced.

15. The system of claim 1, wherein a communication protocol for coupling the plurality of student terminals to the teacher's station is a 802.11 wireless local area network.

16. The system of claim 1, wherein the communication network coupling each student terminal to the teacher's station is the Internet.

17. The system of claim 16, wherein each student terminal has its own connection via a TCP/IP server for transmitting pen strokes, keystrokes and voice input.

18. The system of claim 16, wherein the student terminals each have their own set of separate TCP/IP connection for transmitting pen strokes, keystrokes and voice input.

19. An electronic educational system enabling a teacher to author a variety of educational and program material comprising:
   a teacher's station including a computer, a screen, and audio communications means;
   terminals each including graphic notation means including an electronic pen and a set of alpha-numeric keys, each such terminal also including a display and being usable to display handwritten graphic components and alpha-numeric components of response inputs entered on the display as well as audio communication input devices operable contemporaneously with the graphic notation means and wherein a time duration of an audio input of each terminal is displayed on the teacher's station screen on an ongoing basis;
   a communication circuit coupling each terminal to the computer for receiving and displaying the graphic component and the alpha-numeric component inputs from each terminal in real time and for receiving and reproducing the audio communications from each terminal; and a class display in communication with the computer at the teacher station for reproducing inputs originating from each terminal while preserving the time relationships between the graphic and audio inputs.

20. A psychology testing system enabling mental chronometry testing of persons by a tester, comprising:
- a terminal for each person to be tested, each terminal including graphic notation means including an electronic pen, a set of alpha-numeric keys, each terminal also including a display providing concurrent representations of the response inputs from that person and being usable to display handwritten graphic components, together with alpha-numeric components of response inputs of each person to be tested;
- each terminal also including audio communication means;
- a communication network coupling each person's terminal to a tester's station; and
- the tester's station including a computer, a screen, audio communications means, and network communication connections for providing information and request data input to the terminals and for receiving and concurrently display the graphic component and the alpha-numeric component response inputs from each person to be tested in real time and for recording the inputs as well as the reaction and execution times of each person's inputs in real time, the audio communications means being operable contemporaneously with the graphic notation means and wherein a time duration of an audio input of each terminal is displayed on the tester's screen on an ongoing basis.

* * * * *